United States Patent Office 2,916,356
Patented Dec. 8, 1959

2,916,356

CALCINATION OF MACROSIZE ALUMINA HYDRATE

Carl D. Keith, Munster, Ind., and Bernard Seligman, East Orange, N.J., assignors to Engelhard Industries, Inc., a corporation of New Jersey No Drawing. Application September 16, 1955
Serial No. 534,888

11 Claims. (Cl. 23—142)

This invention relates to the calcination of alumina hydrates to obtain a product of high surface area useful in catalyst compositions. More specifically, this invention is concerned with the adiabatic calcination of hydrated alumina compositions which comprise a predominant amount of trihydrate to obtain a large pore, high surface area product which is useful in catalyst compositions exhibiting activity for the conversion of petroleum hydrocarbons. The resulting high area product is particularly useful as the supporting base for platinum metals, most advantageously platinum, in catalysts for reforming petroleum hydrocarbons boiling in the gasoline range.

It has been found, as set forth in the patent applications of Teter, Gring and Keith, Serial Nos. 288,058, filed May 15, 1952, now abandoned, and 489,726, filed February 21, 1955, now Patent No. 2,838,444, that an excellent catalyst is provided for reforming petroleum naphthas which contain about 0.1 to about 1 weight percent or more of platinum in finely dispersed form on an alumina base which is derived from a precursor alumina hydrate composition which predominates in trihydrate alumina. Usually about 65 to about 95 weight percent of the precursor hydrate is trihydrate comprising one or more of the gibbsite, bayerite and randomite forms as defined by X-ray diffraction analysis. The substantial balance of the hydrous alumina composition is composed of amorphous hydrous alumina or a form corresponding after drying to monohydrate, e.g. boehmite, or mixtures of these forms. The trihydrates are present as well defined crystallites when examined by X-ray diffraction means. The calcined catalyst in the virgin state is characterized by large surface area ranging from about 350 to about 550 or more square meters per gram as determined by the BET adsorption technique. The calcined catalyst also has a large portion of its pore volume in the pore size range of about 100 to about 1000 Angstrom units, generally having about 0.1 to about 0.5, preferably from about 0.15 to about 0.3, cc. per gram of pore volume in this range. Pore volumes are determined from desorption isotherms for nitrogen by the method of Barrett, Joyner and Halenda, JACS 73, 373 (1951). The crystallite size of the precursor alumina trihydrate also is relatively large and usually is in the approximate 100 to 1000 Angstrom unit range.

In preparations of the catalyst of the Teter, Gring and Keith applications the high area catalyst base was afforded by use of the trihydrate-containing precursor and calcination in flowing air. In these preparations the calcination was conducted while using relatively small amounts of uncalcined catalyst in a system which was essentially isothermal, that is the catalyst bed was brought to elevated temperature, for instance 900° F., and this temperature was maintained throughout the catalyst particle mass by transfer of heat through the calciner walls and by preheating the gas stream. When calcining on a commercial basis where large quantities of catalyst are treated in relatively large calcining vessels, an isothermal system can be economically prohibitive, and accordingly it was considered advisable to effect the calcination of the trihydrate-containing precursor in an adiabatic system in the plant constructed to manufacture the Teter, Gring and Keith catalyst for commercial reforming units processing thousands of barrels of feed per day. By an adiabatic system we mean that the essential heat required for calcination is added by preheating the gases passing over the catalyst precursor undergoing calcination as distinguished from heating by transfer through the calciner walls.

We have found that when adiabatically calcining macrosize particles of a catalyst base precursor containing a predominant amount of alumina trihydrate and a minor amount of monohydrate or amorphous forms or their mixture, certain processing conditions should be observed in order that the resulting catalyst base be of high area and good physical strength. Such control is necessary due to the nature of the precursor base and the desire to obtain a calcined base of surface area of at least about 350 square meters per gram and preferably at least about 400 square meters per gram as determined by the BET method. Thus, in the present invention the precursor alumina hydrate containing about 50 to about 95 weight percent of one or more of the trihydrate forms and about 5 to about 50 weight percent of monohydrate or amorphous forms or their mixture, preferably about 65 to about 90% trihydrate and about 10 to about 35% monohydrate or amorphous forms, is calcined as a fixed bed in contact with a flowing gas under adiabatic conditions. The alumina hydrate particles are charged to the calciner as macrosize particles formed by tableting or extrusion, preferably extrusion, and generally these particles are at least about $\frac{1}{16}''$ in both length and diameter and preferably do not exceed about $\frac{1}{4}''$ in these dimensions; however, larger and smaller particles can be employed and particularly their length may be as much as $1''$ or more. Ordinarily, these longer particles are broken before use in converting petroleum hydrocarbons. It is most desirable to dry the alumina hydrate before formation of the particles by tableting or extruding, and previous to these forming operations the particles can be impregnated with a catalytically active metal component if desired. Although the particles can be calcined, impregnated with an active metal and then recalcined, in this procedure the first calcination and, if desired, the second calcination should be conducted in accordance with the procedure of this invention.

The gas flowing over the fixed bed of particles during the calcination is preferably composed of air; however, it can be other substantially inert gases such as flue gas, nitrogen or mixtures of nitrogen and oxygen in proportions other than as in air. By the term "inert gas" we intend to designate gases which are essentially chemically inert as to the precursor base. Thus, in this sense, air is considered an inert gas even though when the precursor base contains a metal sulfide, e.g. platinum sulfide, it may be converted to such as platinum oxide during contact with flowing air during calcination.

We have found that in calcining the macrosize particles the gas flow rate should be controlled. If the gas flow rate be too low, calcination is effected so slowly that excessive lengths of time are required. Further the gas flow rate should not be too high, otherwise, the calcined particles develop excessive cracks. These cracks may be very fine and not detectable even under the microscope; however, their presence can be established as by dyeing the particles and if desired subsequent immersion in a mineral oil. In view of these considerations the gas flow rate or space velocity employed in our present method ranges from about 150 to about 1500, preferably about 300 to about 700, standard cubic feet of gas per cubic foot of catalyst per hour. Also, the superficial velocity of the gas measured at 60° F. should be from about 0.05 to about 0.5 foot per second, preferably about 0.1 to about 0.35 foot per second.

We have also found in the calcination of the alumina hydrate compositions to afford the high area base the moisture content of the gas should be controlled and must be correlated with the temperature of the catalyst undergoing calcination. It will be appreciated that the temperature of the separate portions of the catalyst bed will vary at a given time since we employ an adiabatic system. For instance, this can be illustrated by assuming that the calciner contains a vertically disposed bed of dried alumina hydrate with the air flow being downwardly through the bed. This is an arbitrary assumption as the position of the bed and the direction of the gas flow can be as desired. In the assumed system, heated inlet air enters the top of the bed of alumina hydrate and loses heat to the catalyst. Generally, the entering air will have a temperature of at least about 400° F. and preferably at least about 500° F. during the initial portion of the calcination period during which any free water remaining in the catalyst and the water of crystallization of the trihydrate are released. In starting up the calcination the air may be at ambient temperature and increase to trihydrate dehydration temperatures. As air or other gas is employed as the essential heat source its temperature must be higher than the catalyst in order that the catalyst be heated; however, after the catalyst bed has reached the desired maximum temperature it can be held by contact with gas of substantially the same temperature taking into account heat losses such as those to the surroundings. The maximum temperature of the gas may be as high as about 1100° F. Higher temperatures, for instance 1200° F. or more, may be employed but excessive temperatures may give rise to undue sintering of the base.

As the flow of gas continues the temperature of a given segment of the catalyst bed, for instance the top of the bed, will rise with lower portions being heated to a lesser extent. The temperature of the given portion of the bed will increase steadily until any free water present and the water of crystallization starts to be evaporated. The removal of water of crystallization will be first observed at temperatures around 400 to 500° F. The temperature will level off in this range and remain substantially constant until the trihydrate water of crystallization is substantially completely removed and then the selected portion of the bed will advance to that of the entering gas. Where the precursor base contains a relatively high concentration of monohydrate or amorphous forms, a change in the rate of catalyst heating may be noted as the water of crystallization in the phases is removed. The temperatures in each subsequent segment of the bed will follow this general behavior until the entire bed is at a temperature substantially equal to that of the entering gas allowing for heat losses to the surroundings.

As previously indicated, the moisture content of the entering calcination gas should be controlled. During the calcination the moisture content of the gas should be correlated with temperature and at temperatures above about 700° F., and preferably above about 600° F., the dew point of the entering gas is less than about 30° F. and preferably less than about −30° F. Until the particles undergoing calcination reach the approximate 600 or 700° F. temperature, as the case may be, the moisture content of the calcining gases can vary rather widely depending upon the effect desired. However, the dew point of the gas at the lower dehydration temperatures can be up to about 125° F. or somewhat higher and is preferably up to about 105° F. There is no minimum on the amount of water in the calcination gas during either the low temperature or the subsequent high temperature periods. On the other hand, it has been found that catalyst particles of increased strength having reduced surface cracks can be obtained by the dew point of the calcination gas being about 65° F. to about 125° F. and preferably from about 65° F. to about 105° F., during the low temperature dehydration, i.e. below approximately 600 or 700° F. Under these moisture conditions, we prefer that the superficial velocity of the calcination gases be up to about 0.35 foot per second, e.g. from about 0.1 to about 0.35 foot per second. As certain higher boiling point vapors which may be present may have an influence on dew point, we intend by the use of this term that the water content of the entering calcination gas in terms of amount of water per unit volume of gas correspond to that of the indicated dew point of air.

After the initial dehydration or low temperature period, in which the water is expelled from the trihydrate, the catalyst temperature is raised to about 750 to about 1200° F. or more and the calcination finished to insure the substantial removal of water of crystallization from the trihydrate, monohydrate and amorphous forms. The length of time the high temperature should be maintained can be varied. Essentially we desire to remove substantially the water of crystallization and effect the desired increase in the surface area of the base particles. Usually the maximum increase in area is obtained fairly rapidly, e.g. within about two hours at 900° F. The operator can, of course, stop the calcination at any time during the high temperature period he desires; however, the surface area of the calcined particles should be at least about 350 square meters per gram. The high temperature calcination period can continue as long as desired but should the temperature be too great for extended periods undue catalyst sintering and loss of surface area might be obtained. The calcined catalyst base generally contains upwards of about 2% by weight of volatile matter at 1100° F. and if calcined at a maximum temperature of 900° F. with dry air and cooled with dry air (the dry air being <−90° F. dew point), such volatile matter generally constitutes from about 2 to about 5% of the weight of the base.

The calcined alumina particles which are gamma-alumina modifications exhibit excellent desiccating properties when cooled. In order to avoid picking up water from the atmosphere we prefer to cool the calcined particles under particular conditions. By this method the calcined particles are cooled to a convenient packaging temperature, e.g. less than about 125° F., through contact with an inert gas, preferably air, having a dew point of up to about 30° F. and preferably of up to about −30° F. This pickup of water could also be avoided by placing the calcined catalyst while hot in a container followed by sealing of the container with the catalyst in the heated state.

In identifying the several trihydrate components and the amorphous and monohydrate forms and their amounts in the total hydrous alumina phase, X-ray diffraction techniques are employed on samples dried at 110° C. When designating herein the amount of trihydrate or amorphous and monohydrate forms present, it is referred to determinations made on samples of alumina hydrate dried at 110° C. which had not previously been dried. Also the trihydrate form randomite appears to be a trihydrate of crystalline form intermediate the structure of the well-known gibbsite and bayerite with the randomite giving an X-ray diffraction line at 4.79 Angstrom units.

The alumina hydrate compositions containing the trihydrate and amorphous or monohydrate forms calcined in the present method can be prepared by various procedures. For instance, an alumina hydrogel may be formed by precipitating, for example, at temperatures of about 50 to 160° F., a gelatinous hydrous oxide from a solution of a soluble aluminum salt, such as aluminum chloride, by the action of a precipitating agent which is preferably ammonium hydroxide. Other sources of aluminum, such as aluminum sulfate or sodium aluminate, can be employed but subsequent washing may be more difficult than when employing aluminum chloride. When preparing the hydrate from aluminum chloride the gel formation is at a pH of about 7 to about 10 and preferably at least about 8. Extraneous ions introduced in the preparation, such as chloride ions, are removed by water washing to avoid corrosion difficulties in subsequent handling and to enable the aging of the hydrate composition. The aluminum hydrogel is converted to the desired alumina hydrate by aging for a period of up to several days at a pH from about 7 to about 10 accompanied if desired by seeding with trihydrate crystallites. Suitable aging temperatures include from about 70 to about 100° F. This method of forming the alumina trihydrate composition useful in the present invention is described with particularity in the Teter, Gring and Keith applications. These applications also describe the preparation of a platinum reforming catalyst from the trihydrate-containing precursor material which can include impregnation with platinum as through the use of chloroplatinic acid and hydrogen sulfide followed by drying and formation of macrosize particles. These particles can be calcined according to the method of the present invention.

Generally, the alumina compositions of this invention are combined with one or more catalytically active promoting metal components before use as a catalyst. Thus, the hydrate can be impregnated with the metal component before or after drying or even after calcination if desired. In the latter cases it will usually be desirable to recalcine the base after addition of the metal component. Any of the various catalytic promoting metals can be employed on the base, and the selection of a particular metal or mixture of metals will usually depend upon the type of catalytic activity desired in the final product. Although the selection of a particular promoting metal and the method employed in depositing it on the catalyst base are not a direct concern of this invention, the base derived is particularly useful in manufacturing platinum metal reforming catalysts, particularly platinum-alumina catalysts, containing from 0.1 to about 1.5% or more of platinum metal.

The platinum can be incorporated into the base by adding an aqueous solution of chloroplatinic acid, for example, to the percursor alumina composition followed by precipitation of the platinum in situ by aqueous hydrogen sulfide solution or by gaseous hydrogen sulfide. The resulting slurry is dried, preferably rapidly, in order that the drying be completed in not more than about 24 hours and at a pH of about 6 to 9. The mixture may be dried using a rotary drum type drier or it may be prefiltered to reduce water content and chloride content prior to drying in an oven or it may be dried using a drum drier after reslurrying or it may be spray dried.

The dried precursor mixture then may be formed as by a tableting or extruding operation. The formed particles are calcined in accordance with the present invention and should they contain organic matter, for instance die lubricant employed in tableting, the calcination can be initiated with a mixture of air and nitrogen to avoid local hot spots through oxidation of the organic material. The formed particles, particularly if extruded, can be partially or completely dried before calcination. When calcining particles contain no organic material the use of nitrogen with the air would not be necessary.

The present invention will be illustrated further by the following examples which are not to be considered limiting.

EXAMPLE I

This example illustrates the preparation of the alumina hydrate composition and a platinum-alumina reforming catalyst where it is preferred to employ relatively pure reagents in avoiding excessive contamination. Pure aluminum is dissolved in pure hydrochloric acid and the resulting solution is mixed with deionized water to form an aqueous aluminum chloride solution equivalent to approximately 65 grams of $Al_2O_3$ per liter. A separate deionized water solution of $NH_4OH$ is prepared containing approximately 65 grams of ammonia per liter. These two reagents in approximate volume ratio of 1:1 are intimately mixed as a flowing stream at a pH of 8.0 The flowing stream is passed to a stoneware container and an alumina hydrate is visible. The precipitated hydrate is filtered from the mother liquid and washed to <0.2% chloride by successive filtrations and reslurryings in deionized water until the desired chloride concentration is reached. The washed hydrate is covered with water in a container and aged at about 90° F. until it is approximately 80% trihydrate, the remainder being substantially of the amorphous or monohydrate forms. The total hydrate composition is comprised of 42% bayerite, 18% randomite, 11% gibbsite, 20% boehmite, and 9% amorphous as determined by X-ray diffraction analysis. The aged hydrate is mixed with deionized water in a rubber lined container to provide a slurry of about 7 weight percent $Al_2O_3$ at a pH of about 8.0. A chloroplatinic acid solution in deionized water (0.102 gram platinum per milliliter) is stirred into the slurry and the slurry is then contacted with a deionized water solution which has been saturated with $H_2S$ at 78° F. to precipitate the platinum. The pH of the slurry is adjusted to 6.0 to 6.5 by ammonium hydroxide addition and the solids of the slurry are dried on a horizontal drum drier to give a powder of generally less than 20 mesh. The drum dried powder is mixed in a planetary type dough beater with sufficient deionized water to indicate 26 weight percent water on a Central Scientific Company infra-red moisture meter containing a 125 watt bulb, Cat. No. 26675. The resulting mixture is forced through a die plate having holes $\frac{1}{16}''$ in diameter bolted to a $3\frac{1}{2}''$ welding engineer's screw extruder. The resulting strands are broken to particles of length varying generally between about $\frac{1}{16}''$ to $1''$.

Platinum-alumina hydrate particles prepared essentially by this procedure were then calcined by disposition as a 27" deep fixed bed in a 6' diameter vertical calciner equipped for downflow of heated air through the bed. The air flow rate is about 510 standard cubic feet per cubic foot of catalyst per hour, and the air has a dew point of <−90° F. The incoming air is brought from room temperature to about 900° F. while taking about 8.5 hours for the lowermost portion of the bed to reach 840° F. The 900° F. entering air flow continues for about 2.5 more hours. The calcined catalyst is then cooled to about 100° F. with <−90° F. dew point air in about 3 hours. The cooled catalyst is packaged in a sealed container. The final catalyst contains about 0.6 weight percent platinum, has a surface area of about 510 square meters per gram (small angle X-ray diffraction technique), 3.71 weight percent volatile matter at 1100° C. and 14.0 pounds crushing strength. The calcined particles have a considerable number of microcracks and upon heating for 16 hours at 1150° F. the crushing strength is 11.6 pounds.

EXAMPLE II

Several calcinations of platinum-alumina hydrate particles prepared essentially as in Example I were conducted according to a procedure employing air of differing inlet temperature and moisture content to illustrate the effect on the physical characteristics of the catalyst. The pertinent data of these runs are in Table I. For convenience the calcination operation is divided into the dehydration period where the particles being calcined are generally at low temperature and trihydrate water of crystallization is removed; and the calcination period where the particles are at higher temperature where monohydrate water of crystallization is removed and there is a surface area increase. These designations of periods and explanations of physical changes occurring are not to be considered limiting.

*Table I*

|  | Example I | Run 1 | Run 2 | Run 3 | Run 4 |
|---|---|---|---|---|---|
| Catalyst Charge, lbs | | | 7.64 | 7.64 | 7.64 |
| Air Rate, s.c.f.m | | | 0.88 | 0.88 | 0.88 |
| Superficial Velocity, ft./sec., 60° F | 0.32 | 0.32 | 0.18 | 0.18 | 0.18 |
| Air Flow Rate, s.c.f.h./cubic foot of catalyst | 510 | 510 | 435 | 435 | 435 |
| Dehydration Period: | | | | | |
|   Inlet Air Temperature, °F.[1] | 900 | 650 | 550 | 650 | 907 |
|   Dew Point of Air, °F | <−90 | +106 | +82 | +106 | <−90 |
| Calcination Period: | | | | | |
|   Inlet Temperature, °F.[2] | 900 | 890 | 903 | 903 | 904 |
|   Dew Point of Air, °F | <−90 | <−90 | <−90 | <−90 | <−90 |
| Cooling Period: | | | | | |
|   Dew Point of Air, °F | <−90 | <−90 | <−90 | <−90 | <−90 |
| Time Required, hrs.: | | | | | |
|   Dehydration Period [3] | 8.5 | 18 | 39 | 25 | 23 |
|   Calcination Period | 2.5 | 2 | 2 | 2 | 2 |
|   Cooling Period | | | 6 | 7 | 7 |
| Surface Area of Calcined Catalyst, Sq. meters/gram. | | | | | |
|   By small angle X-ray diffraction technique | 510 | 518 | 515 | 519 | 527 |
| Percent Volatile Matter at 1100° C | 3.71 | 3.59 | | 4.26 | 4.31 |

[1] Operating temperature; increased from ambient.
[2] Operating temperature; increased from operating temperature used for dehydration period.
[3] Approximate time required to dehydrate and bring catalyst to calcination temperature.

Samples from each of these calcinations were dyed and inspected under the microscope for microcracks. There were substantially less microcracks in the particles from the calcination of run 1 than present in the calcined catalysts of Example I and run 4 and the catalyst from calcination runs 2 and 3 contained less cracks than the particles of calcination run 1. In runs 1, 2 and 3 the air inlet temperatures in the dehydration period were comparatively low and the air contained a controlled amount of moisture. In runs 2 and 3 a lower superficial velocity was employed as compared with that of run 1.

EXAMPLE III

Several calcinations were conducted on catalysts prepared essentially as described in Example I which illustrate that an improvement from the standpoint of a lesser number of microcracks in the product can be obtained over the results of Example I even though low humidity air is employed throughout the calcination when a low superficial air velocity be employed. Data pertinent to these calcinations appear in Table II.

We claim:
1. In a method for adiabatically calcining macrosize particles of an alumina hydrate composition, said composition containing a predominant amount of trihydrate and from about 5 to about 50% of hydrous alumina selected from the group consisting of monohydrate and amorphous forms and their mixture to obtain catalyst particles of gamma-alumina modifications having a surface area of about 350 to about 550 square meters per gram (BET method), the steps comprising contacting a fixed bed of said alumina hydrate particles with a heated gas which is the essential heat source and is essentially chemically inert to the alumina hydrate to remove trihydrate water of crystallization at a temperature of up to about 700° F., said gas having a dew point of up to about 125° F. and being supplied at the rate of about 150 to about 1500 standard cubic feet per cubic foot of catalyst per hour and at a superficial velocity of about 0.05 to about 0.5 foot per second and then completing the calcination of said particles at a temperature from about 750 to about 1200° F. by contact with a heated gas which is the essential heat source and is essentially chemically inert to the alumina hydrate at a rate from about 150 to about 1500 standard cubic feet per cubic foot of catalyst per hour and at a superficial velocity of about 0.05 to about 0.5 foot per second, to obtain the calcined particles of surface area of from about 350 to about 550 square meters per gram (BET method), said gas employed in completing the calcination having a dew point of up to about 30° F.

2. The method of claim 1 in which the substantially inert gas is air.

*Table II*

|  | Example I | Run 4 | Run 5 | Run 6 |
|---|---|---|---|---|
| Catalyst Charge, lbs | | 7.64 | 1,283 | 3.82 |
| Air Rate, s.c.f.m | | 0.88 | approx. 180 | 0.44 |
| Superficial Velocity, ft./sec., 60° F | 0.32 | 0.18 | approx. 0.11 | 0.09 |
| Air Flow Rate, s.c.f.h./cubic foot of catalyst | 510 | 435 | 510 | 435 |
| Dehydration Period: | | | | |
|   Inlet Air Temperature, °F.[1] | 900 | 907 | 910 | 908 |
|   Dew Point of Air, °F | <−90 | <−90 | <−90 | <−90 |
| Calcination Period: | | | | |
|   Inlet Temperature, °F.[2] | 900 | 904 | 875–910 | 914 |
|   Dew Point of Air, °F | <−90 | <−90 | <−90 | <−90 |
| Cooling Period: | | | | |
|   Dew Point of Air, °F | <−90 | <−90 | <−90 | <−90 |
| Time Required, hrs.: | | | | |
|   Dehydration Period [3] | 8.5 | 23 | 7 | 26 |
|   Calcination Period | 2.5 | 2 | approx. 3 | 2 |
|   Cooling Period | | 7 | approx. 4 | 10 |
| Surface Area of Calcined Catalyst, sq. meters/gram. By small angle X-ray diffraction technique | 510 | 527 | 537 | 543 |
| Percent Volatile Matter at 1,100° C | 3.71 | 4.31 | 3.95 | 4.67 |

[1] Operating temperature; increased from ambient.
[2] Operating temperature; increased from operating temperature used for dehydration period.
[3] Approximate time required to dehydrate and bring catalyst to calcination temperature.

By inspecting samples from each of the calcinations of runs 5 and 6 under the microscope after dyeing, it was noted that they contained a lesser number of microcracks than the calcined catalysts of Example I and run 4 but more microcracks than present in the calcined particles of runs 2 and 3 of Example II.

3. The method of claim 1 in which the substantially inert gas is supplied at a rate from about 300 to about 700 standard cubic feet per cubic foot of catalyst per hour and the superficial velocity is from about 0.1 to about 0.35 foot per second.

4. In a method for adiabatically calcining macrosize particles of an alumina hydrate composition, said composition containing a predominant amount of trihydrate and from about 5 to about 50% of hydrous alumina selected from the group consisting of monohydrate and amorphous forms and their mixture to obtain catalyst particles of gamma-alumina modifications having a surface area of about 350 to about 550 square meters per gram (BET method), the steps comprising contacting a fixed bed of said alumina hydrate particles with heated air as the essential heat source to remove trihydrate water of crystallization at a temperature of up to about 700° F., said air having a dew point of up to about 125° F. and being supplied at the rate of about 300 to about 700 standard cubic feet per cubic foot of catalyst per hour and at a superficial velocity of about 0.1 to about 0.35 foot per second, and then completing the calcination of said particles at a temperature from about 750 to about 1200° F. by contact with heated air as the essential heat source being supplied at a rate from about 300 to about 700 standard cubic feet per cubic foot of catalyst per hour and at a superficial velocity of about 0.1 to about 0.35 foot per second to obtain the calcined particles of surface area of from about 350 to about 550 square meters per gram (BET method), said air employed in completing the calcination having a dew point of up to about −30° F.

5. The method of claim 4 in which the calcined particles are cooled to substantially atmospheric temperature by contact with air having a dew point of up to about −30° F.

6. In a method for adiabatically calcining macrosize particles of an alumina hydrate composition, said composition containing a predominant amount of trihydrate and from about 5 to about 50% of hydrous alumina selected from the group consisting of monohydrate and amorphous forms and their mixture to obtain catalyst particles of gamma-alumina modifications having a surface area of about 350 to about 550 square meters per gram (BET method), the steps comprising contacting a fixed bed of said alumina hydrate particles with a heated gas which is the essential heat source and essentially inert to the alumina hydrate to remove trihydrate water of crystallization at a temperature of up to about 700° F., said gas having a dew point of about 65 to about 125° F. and being supplied at the rate of about 150 to about 1500 standard cubic feet per cubic foot of catalyst per hour and at a superficial velocity of about 0.05 to 0.5 foot per second, and then completing the calcination of said particles at a temperature from about 750 to about 1200° F. by contact with a heated gas which is the essential heat source and essentially chemically inert to the alumina hydrate at a rate from about 150 to about 1500 standard cubic feet per cubic foot of catalyst per hour and at a superficial velocity of about 0.05 to about 0.5 foot per second, to obtain the calcined particles of surface area of from about 350 to about 550 square meters per gram (BET method), said gas employed in completing the calcination having a dew point of up to about 30° F.

7. The method of claim 6 in which the substantially inert gas is air.

8. In a method for adiabatically calcining macrosize particles of an alumina hydrate composition, said composition containing a predominant amount of trihydrate and from about 5 to about 50% of hydrous alumina selected from the group consisting of monohydrate and amorphous forms and their mixture to obtain catalyst particles of gamma-alumina modifications having a surface area of about 350 to about 550 square meters per gram (BET method), the steps comprising contacting a fixed bed of said alumina hydrate particles with a heated air as the essential heat source to remove trihydrate water of crystallization at a temperature of up to about 700° F., said air having a dew point from about 65 to about 125° F. and being supplied at the rate of about 300 to about 700 standard cubic feet per cubic foot of catalyst per hour and at a superficial velocity of about 0.1 to about 0.35 foot per second and then completing the calcination of said particles at a temperature from about 750 to 1200° F. by contact with a heated air as the essential heat source being supplied at a rate from about 300 to about 700 standard cubic feet per cubic foot of catalyst per hour and at a superficial velocity of about 0.1 to about 0.35 foot per second to obtain the calcined particles of surface area of from about 350 to about 550 square meters per gram (BET method), said air employed in completing the calcination having a dew point of up to about −30° F.

9. The method of claim 7 in which the calcined particles are cooled to substantially atmospheric temperature by contact with air having a dew point of up to about −30° F.

10. The method of claim 1 in which the macrosize particles of alumina hydrate are extruded particles.

11. The method of claim 6 in which the macrosize particles of alumina hydrate are extruded particles.

References Cited in the file of this patent

UNITED STATES PATENTS

| | | |
|---|---|---|
| 2,345,600 | Heard et al. | Apr. 4, 1944 |
| 2,415,061 | Simo et al. | Jan. 28, 1947 |
| 2,499,675 | Owen | Mar. 7, 1950 |
| 2,636,865 | Kimberlin | Apr. 28, 1953 |
| 2,692,259 | Peters | Oct. 19, 1954 |
| 2,781,324 | Haensel | Feb. 12, 1957 |

OTHER REFERENCES

Chemical Engineers' Handbook, edited by John H. Perry, third ed., McGraw-Hill Co., 1950, page 813.